Aug. 10, 1965  G. BRASE  3,199,384
PIPE NIPPLE WRENCH WITH TORQUE BOOSTER
Filed June 1, 1962  3 Sheets-Sheet 1
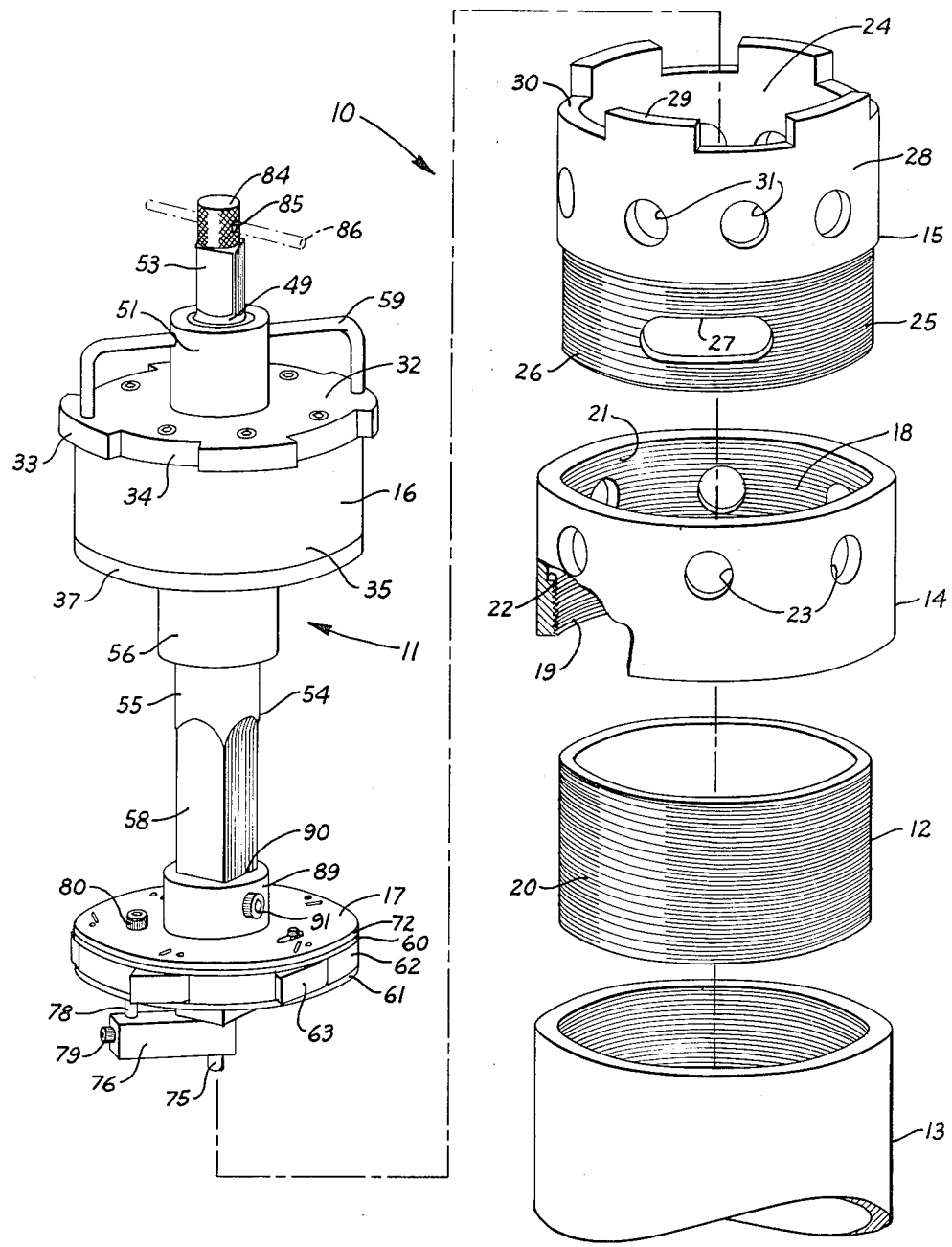
FIG. 1.
INVENTOR.
GEORGE BRASE
BY 
ATTORNEY INVENTOR.
GEORGE BRASE
BY *A. Duncan Oliver*
ATTORNEY Aug. 10, 1965 G. BRASE 3,199,384
PIPE NIPPLE WRENCH WITH TORQUE BOOSTER
Filed June 1, 1962 3 Sheets-Sheet 3
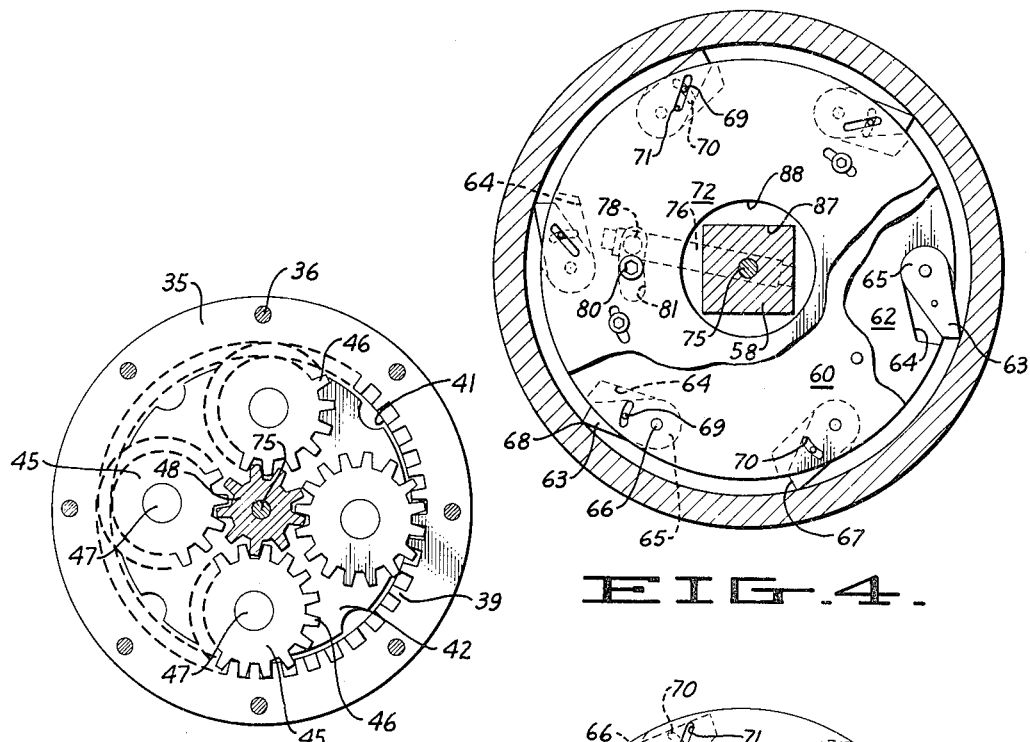
FIG. 4.
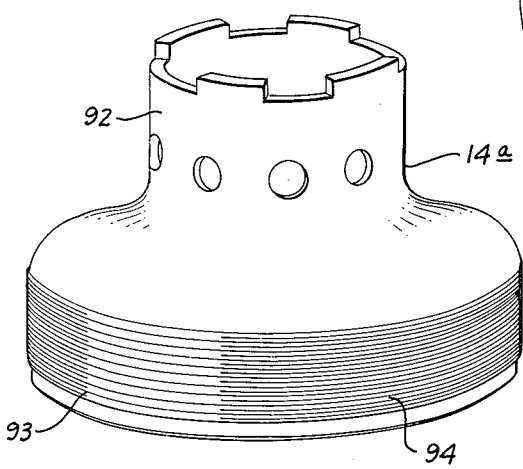
FIG. 3.
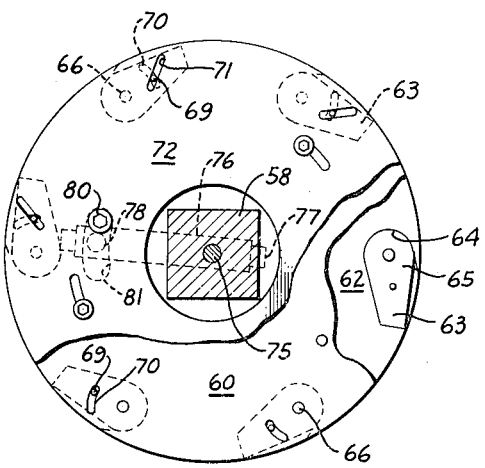
FIG. 5.
FIG. 6.
INVENTOR.
GEORGE BRASE
BY
ATTORNEY

United States Patent Office 3,199,384
Patented Aug. 10, 1965

3,199,384
PIPE NIPPLE WRENCH WITH TORQUE BOOSTER
George Brase, San Francisco, Calif.
(334 Cardinal Court, Mill Valley, Calif.)
Filed June 1, 1962, Ser. No. 199,533
9 Claims. (Cl. 81—57)

This invention relates generally to tools for handling threaded fittings such as pipe-nipples and the like. More particularly, it is directed to an improved nipple wrench that is capable of multiplying the input torque applied to it to produce an increased output torque on the nipple to which the wrench is attached.

The installation and especially the removal of pipe nipples from fittings in fluid conduits heretofore involved two basic problems. One was to provide a means for gripping the nipple so that a large torque could be applied to it without damaging the nipple threads. A second problem was then to provide a torque on the gripping means that was sufficient to loosen the nipple and unscrew it from the fitting to which it was attached. An extra amount of torque was often required in removing nipples that had become "frozen" within a pipe fixture due to corrosion or other foreign substances. These difficulties became even more serious with pipe nipples of unusually large size such as those commonly used in many industrial fluid conduit systems.

In my copending application Serial No. 199,386, filed June 1, 1962, now Patent No. 3,151,511, I disclosed a solution to the problem of gripping large sized pipe nipples so as not to damage their threads. Certain principles of that invention are applied in combination with the elements of the present invention. However, this device did not provide a solution to the problem of supplying the large torque to the gripping means that was often required in order to loosen or to tighten large sized pipe nipples or other similar threaded fittings.

Accordingly, it is one primary object of my invention to provide an improved wrench for large sized pipe nipples that solves both of the aforementioned problems by gripping the pipe nipple firmly and by providing a means for applying an increased torque to the nipple during its installation or removal.

A more specific object of the present invention is to provide a wrench for use on pipe nipples that will grip the nipple and then multiply the input torque applied to the wrench and thus exert an increased output torque directly on the nipple. In wrenches heretofore devised for use on threaded fittings such as pipe nipples, the only means for increasing the torque output of the wrench gripping the fitting was to increase the torque input to the wrench by the same amount. Prior to my invention this could be accomplished only by using a more powerful impact wrench of the pneumatic or electrical type on the wrench gripping the nipple or by employing a longer lever arm on a torque bar attached to the wrench. The first expedient is limited by the size of the impact wrench available, and in most instances the latter expedient is awkward and impractical because of the large amount of space required to manipulate a long lever arm. Now, with the present invention a large multiplication of input torque is obtained by a novel combination of elements that provides a means for gripping the nipple and also produces a substantial mechanical advantage between the torque input and output portions of the wrench.

Still another object of my invention is to provide an improved wrench for handling large sized pipe nipples including a device that mechanically increases the input torque and which is easily attachable and detachable to a nipple gripping member of the wrench in driving engagement therewith.

Further important objects of my invention are: to provide an improved pipe nipple wrench that is compact and easy to operate; to provide a wrench that can be utilized for installing as well as removing pipe nipples; to provide a nipple wrench that is readily adaptable to be driven by an electrical or pneumatically powered impact wrench; and to provide an improved nipple wrench which fulfills all of the aforesaid objects and is particularly adaptable for ease and economy of manufacture.

Broadly speaking, my invention provides a torque boosting wrench for threaded pipe nipples that utilizes a novel arrangement of gears in a housing that can be drivingly interlocked in combination with a nipple gripping bolt member of the wrench. The gear train is driven by a central drive gear on a shaft adapted for connection with a suitable powered rotary impact wrench. In order for the gear train to transmit torque to a fixed ring gear on the inside of the housing in accordance with the embodiment described it was necessary to support a series of rotatable satellite gears meshed with both the drive gear and the ring gear on a central disc which had to be kept from rotating as the central shaft was driven. This problem was solved in my invention by means of a releasable clutch member attached by means of an axial shaft to the central disc. The clutch can be controlled by external means on the wrench and actuated to grip the sides of the pipe to which the nipple is threaded. Also it is readily reversible so that it can be used for rotating a nipple in both directions for either removing it from or installing it in a threaded opening.

Other objects, advantages and features of the invention will become apparent from the following detailed description and from the drawings, in which:

FIG. 1 is an exploded view in perspective of a nipple wrench embodying the principles of the invention showing its various main components separated from each other and from a pipe nipple adapted to be connected with an adjoining female pipe section;

FIG. 3 is a plan view in section taken along the line 3—3 of FIG. 2 and showing internal details of the torque booster portion of the wrench;

FIG. 4 is a plan view in section taken along the line 4—4 of FIG. 2 and showing the upper side of the clutch portion of the wrench with its dog members extended, portions have been broken away to show internal details of the clutch;

FIG. 5 is a plan view of the clutch portion of the wrench as shown in FIG. 4 but with the dog members retracted;

FIG. 6 is a view in perspective of a modified form of the barrel portion of the wrench according to the invention.

Figure 2:
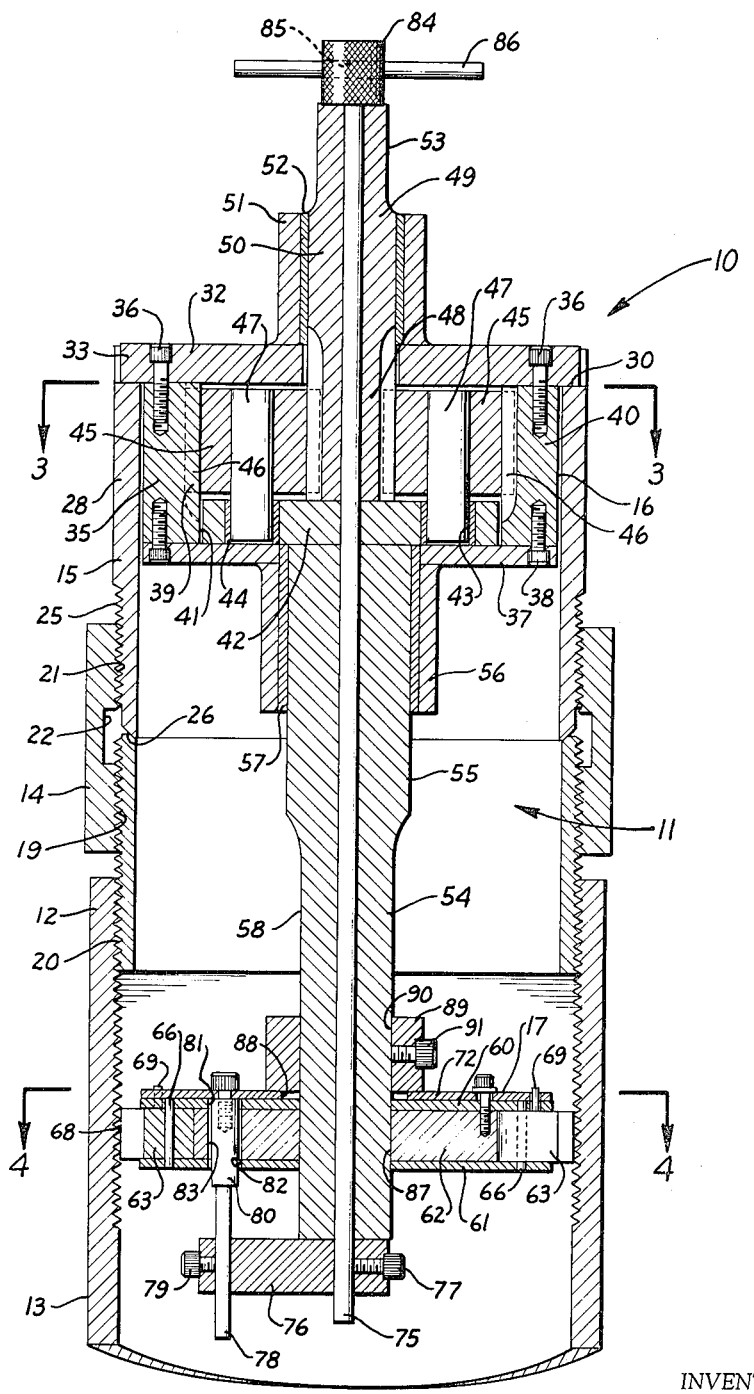
FIG. 2 is a view in elevation and in section of the wrench shown in FIG. 1, as it appears when engaged to a pipe nipple that is being removed from a pipe.

In FIG. 1 a nipple wrench 10 in combination with a mechanical torque booster 11 embodying the principles of the invention is shown in an exploded view separated from the other main wrench components and from a standard pipe nipple 12. The wrench 10 provides a novel and highly effective means for applying an unusually large amount of torque to the nipple 12 during either its installation in or its removal from a standard pipe fitting 13.

The wrench 10 grips the pipe nipple 12 by means of a tubular barrel member 14 that is threaded to the exposed end of the pipe nipple, and a tubular bolt member 15 that is movable axially within the barrel 14 to engage the upper rim of the nipple 12 and to cause the barrel threads to tightly engage the nipple. The torque booster 11 for the wrench 10, according to the invention, has a upper gear train housing 16 that fits down in and interlocks in driving engagement with the bolt member 15. Fixed to the lower end of the torque booster 11 is a clutch member 17 that is adapted to bite into and grip the inside walls of the pipe 13 when the torque booster 11 is operated. The clutch 17 enables an input torque exerted on the torque booster 11 to be transmitted through a gear train to the bolt member 15 and hence to the nipple 12. Therefore, when the components of the wrench 10 including the torque booster 11 are assembled in combination as illustrated in FIG. 2, the torque applied to the wrench 10 is increased by a fixed ratio according to its built-in mechanical advantage, and this increased torque is applied to the bolt member 15 and hence to the pipe nipple 12.

The tubular barrel member 14 has a central bore 18 with a first series of right handed pipe threads 19 at one end adapted to conform to and receive the threads 20 on the standard nipple 12. The opposite end of the bore 18 is tapped with a second series of straight machine or S.A.E. threads 21 that are left handed. The opposed series of threads 19 and 21 are separated by an annular unthreaded portion 22. Near one end of the barrel member 14 are a series of circumferentially spaced apart openings 23 of equal diameter that may be used for temporarily connecting the bolt member 15 and the barrel 14 during certain preliminary manipulation of the wrench 10 on the nipple 12.

The bolt member 15 has a central bore 24 and an external series of left handed threads 25 extending up from its lower end 26 that correspond to the second series of threads 21 of the barrel member 14. The end edge 26 of the bolt member is tapered and preferably knurled so that it will partially enter the end of a pipe nipple and wedgingly lock against the inner end of such a nipple as shown in FIG. 2. A pair of circumferentially extending slots 27 on centers 180° apart, are provided in the lower threaded end portion 26 which cooperate with the openings 23 of the barrel 14 for connecting it and the bolt 15 during initial tightening and loosening of the wrench members. An upper unthreaded portion 28 on the bolt member 15 extends above the threads 25 and its end is castellated about its periphery to form spaced rectangular projections 29, the projections and the notches 30 therebetween preferably being the same size. Approximately, midway the length of the smooth unthreaded portion 28 are a series of circumferentially spaced apart openings 31 to facilitate the turning of the bolt member 15 by a conventional torque bar, when necessary.

The torque booster member 11 is removably interconnected with the bolt member 15 by means of an upper castellated disc-like cover 32 on the gear train housing 16 which has a series of radial projections 33 separated by notches 34 that have substantially the same size and are thereby adapted to mesh in locking engagement with the projections 29 and spaces 30 of the bolt member 15. As shown in FIG. 2, the gear train housing 16, in the form shown, has an annular cylindrical housing member 35 with an outside diameter substantially less than the inside diameter of the bolt member 15, so that it is rotatable therein with ample clearance. The upper cover 32 is removably attached by machine screws 36 to the housing member 35 and similarly a lower cover 37 may be attached thereto by machine screws 38.

The cylindrical housing member 35 comprises an outer ring gear of a planetary gear system and has a series of gear teeth 39 projecting radially inwardly around the upper portion 40 of its inner wall. Below the gear teeth 39 is an annular unthreaded surface 41 which forms a sliding clearance with a central circular disc 42 of uniform thickness rotatably engaged with the lower cover member 37. On the central disc 42 are four spaced apart bores 43, each provided with a bushing 44. Retained in each bore is a circular pinion gear 45 having gear teeth 46 that mesh with the teeth 39 of the cylindrical housing 35. Each pinion gear 45 is rotatably connected by a shaft 47 to a bore 48 in the central disc 42.

All of the pinion gears 45 are engaged by a central drive gear 48 that is axially aligned with the central disc 42. The drive gear 48 comprises the integral lower end portion of a shaft 49 which extends up through the upper cover 32 and is supported about a central cylindrical portion 50 by a bearing sleeve member 51 attached to the upper cover member 32 and having a bushing 52. The upper end portion 53 of the drive shaft 49 has a flat-sided cross section and is adapted to fit the socket of a manual torque wrench or an electrically or pneumatically driven impact wrench of the well known type.

The central disc 42 is fixed by some suitable means to a downwardly extending shaft 54 having an upper cylindrical portion 55 that is rotatably supported by a bearing sleeve member 56 attached to the lower cover 37 and supplied with a close fitting bushing 57. Below its cylindrical portion 55, the shaft 54 has a flat sided portion 58 to which is removably connected the clutch 17.

A pair of metal handles 59 are rigidly fixed to the housing cover 32 and to the bearing sleeve member 51 and provide a means for inserting and removing the torque booster unit 11 into and out of engagement with the bolt member 15.

The clutch 17 is shown in detail in FIGS. 2, 4 and 5, and consists of a pair of parallel circular plates 60 and 61 between which is fixed a thicker central plate 62 having a plurality of dog members 63 pivotally attached at circumferentially spaced apart intervals near its periphery. The dog members 63 are mounted within a cutout slot 64 on the edge of the plate 62. Each dog member has a curved end portion 65 having a constant radius and is mounted on a pin 66 extending through the dog member 63 at the center of curvature of its curved end portion 65 and fixed to the parallel plates 60 and 61. The dog members 63 are tapered slightly from their curved end 65 and are provided with a beveled end face 67 that forms a sharp edge 68. Spaced between the end face 67 and the pin axis 66 on each dog member 63 is a fixed stud 69. The stud members 69 extend through a first series of spaced apart cam slots 70 in the circular plate 60 and also through a second series of cam slots 71 in a third circular plate 72 that is mounted on but rotatable relative to the fixed plate 60. The cam slots 71 in the rotatable plate 72 are straight, have a uniform length and extend outwardly at an angle to the edge of the plate 72. Each cam slot 70 in the plate 60 is spaced from the pivot pin 66 of a dog member 63 and is curved about its axis. Thus, a rotational movement of the plate 72 relative to the plate 60 causes the studs 69 of each dog member 63 to cam outwardly in the slots 71 and hence in the slots 70. The dog members 63 thus pivot outwardly about their pins 66 beyond the edge of the central plate 62, their sharp edges 68 being thereby positioned to bear into and grip the inner walls of a pipe.

The movement of the circular plate 72 to extend or retract the dog members 63 is controlled by a clutch control rod 75 that extends through the central axes of the drive shaft 49, the central disc 42 and the shaft 54. At its lower end the control rod 75 extends through a radially extending arm 76 and is rigidly but adjustably fixed thereto by a set screw 77. At the other end of the arm 76 is mounted a pin member 78, adjustably fixed by a second set screw 79. The pin member 78 is radially aligned with a cylindrical pin member 80 that is fixed to and extends below the movable circular plate 72. The pin member 80 extends through aligned slots 81, 82, and 83 in the two circular plates 60 and 61 and the central circular plate 62 and above the upper circular plate 61 so that it can be engaged from either side of the clutch 17 when the clutch is reversed on the shaft 54 to rotate the plate 72. At its upper end the control rod 75 is threadedly attached to a knurled end member 84 provided with a transverse bore 85 adapted to receive a pin 86 that is helpful in turning the control rod 75.

The clutch 17 is provided with a central straight-sided opening 87 through the plates 60, 61 and 62 and the movable plate 72 has a larger circular opening 88. When the clutch 17 is removably attached to the lower flat sided portion of the shaft 54 its axial position thereon is controlled by an annular collar 89 having a flat sided opening 90 of the same size. A set screw 91 is utilized to fix the collar 89 at the desired location on the shaft 54 in order to establish the correct position for the clutch. The adjustable pin 78 on the arm 76 slidably bears against the movable plate 72 and serves to retain the clutch 17 against the collar 89.

In FIG. 6, a somewhat modified form of barrel member 14a is shown which illustrates how the torque booster member 11 may be used to remove or install pipe nipples of even greater size. The barrel member 14a is bell-shaped and has an upper portion 92 that is essentially the same in size, shape and configuration as the upper unthreaded portion 28 of the barrel 14. However, the lower threaded portion 93 of the barrel 14a is flared outwardly to a larger predetermined diameter and has external left handed threads 94 that correspond with those of a barrel member of the approximate diameter. In such an arrangement the only change required on the torque booster 11 would be to replace the clutch 17 with one having a larger diameter corresponding to the size of pipe and nipple on which the wrench is to be used.

In operation, the wrench 10 is manipulated in essentially the same general manner for both installing a pipe nipple and for removing it from a pipe. For example, as shown in FIG. 2, in removing a pipe nipple 12 that is firmly lodged in place in a pipe fitting 13, the barrel member 14 is first threaded onto the end of the nipple 12 so that the nipple extends into it until all or almost all of the first barrel threads 19 are engaged. The tubular bolt member 15 is then threaded with the left hand threads until its lower knurled and chamfered rim 26 engages the end of the nipple 12 inside the barrel member 14. The torque booster 11 is then inserted into the bolt member 15 so that the castellated portions 33 and 34 of the housing cover 32 are interlocked with the similar castellated portions 29, 30 of the bolt 15, and in this position the clutch 17 extends into the end of the pipe 13 closely adjacent the pipe walls, as shown in FIG. 2. With the torque booster member 11 so positioned, the clutch control rod 75 is rotated clockwise so that the pin 78 in the arm 76 attached to the lower end of the rod engages the stud 80 in the movable disc 72 and cams the dog members 63 outwardly as shown in FIG. 4, so that their sharp edges 68 will dig into the walls of the pipe 13. This prevents any further rotation of the shaft 54 in the same direction.

With the shaft 54 thus rigidly held by the clutch 17, the flat sided upper end of the drive shaft 49 can be engaged by a suitable hand torque wrench or a powered impact wrench and is rotated clockwise. Since the central disc 42 supporting the pinion gears 45 is locked against a clockwise movement by the clutch 17, this clockwise rotation of the drive shaft 49 and its drive gear 48, as shown in FIG. 3, causes a counterclockwise rotation of the pinion or satellite gears 45 and also the ring gear 39 of the gear train housing 16, that is locked to the bolt member 15 (see FIG. 3). Since the bolt member 15, as stated previously, is clamped to the barrel member 14 and to the nipple 12, these three members 12, 14 and 15 are rigidly held together and turn as a single unit, thus causing the nipple 12 to be unthreaded from the pipe 13.

The rotation of the drive shaft 49 and its gear 48 is in a ratio in proportion to the size of the drive gear 48, the pinions 45, and the surrounding ring gear 39 as in any planetary or epicyclic gear system. Any convenient gear ratio can be used within the scope of the invention. In the system of FIG. 3, the ratio is approximately four to one, that is, four revolutions of the drive shaft 49 will cause one revolution of the bolt 15. Consequently, the torque applied by the drive shaft 49 is multiplied by four on the bolt 15 though the distance traveled is proportionately less.

In operating my wrench to install a nipple the aforementioned procedure is essentially the same. First, the clutch member 17 is removed and reversed in position on the lower end of the shaft 54 so that it will prevent rotation of the shaft 54 and the central disc 42 in an opposite or counterclockwise direction. This again enables torque to be transmitted through the gear train from the drive gear 48 to the ring gear 39 and hence to the attached bolt member 15. With the barrel and the bolt members 14 and 15 attached to the nipple 12 in the same manner as shown in FIG. 2, and the torque booster unit 11 in place, the clutch control rod 75 is now rotated in the counterclockwise direction causing the dog members 63 to extend outwardly and engage the walls of the pipe to prevent rotation of the clutch 17 and the shaft 54 in the counterclockwise direction. A manual or impact wrench can now be applied to the drive shaft 49 to rotate it in the counterclockwise direction causing, by virtue of the planetary gear system, a reverse or clockwise rotation of the bolt member 15. The planetary gear system within the gear train housing 16 again provides its multiplication of the torque applied to the drive shaft 49 and this torque is transmitted through the bolt 15 and the barrel member 14 to the nipple 12 to screw it into the pipe 13.

Once the pipe nipple has been installed or has been loosened and is being unscrewed easily, the torque booster unit 11 can be removed by turning the clutch control lever 75 in the unlocking direction. This retracts the dog members 63 and leaves the torque booster 11 free to be lifted by the handles 59 out of the bolt member 15. The bolt member 15 can be easily disconnected from the barrel member 14 by applying a small torque to it by means of a suitable bar placed through a pair of its openings 31. Similarly, the barrel member 14 can be finally removed from the end of the nipple 12 by applying a torque bar through its openings 23.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A wrench for engaging and turning a pipe nipple to facilitate its installation in or removal from a pipe, comprising in combination:
    means for gripping the exposed end of the pipe nipple including a tubular barrel member adapted to be threaded to an open-ended nipple, and a bolt member threadedly connected to said barrel and axially movable therein for engaging the end of said nipple; and
    planetary gear drive means removably connected to said bolt including
    a drive shaft having a drive gear at one end with spaced apart gear teeth along its periphery,
    a rotatable disc fixed to an axially extending shaft,
    a plurality of pinion gears meshed with said drive gear and rotatably mounted on said central disc,
    clutch means attached to said axially extending shaft for engaging the inner wall of the pipe threaded to said nipple to prevent rotation of said central disc,
    an annular drive member having internal gear teeth in mesh with each of said pinion gears,
    said annular drive member having means for drivingly engaging said bolt,
    whereby when said clutch is actuated to rigidly connect said axially extending shaft, and said drive shaft is rotated in one direction, said central disc is prevented from rotating and said pinion gears operate to drive said annular drive member and said bolt.

2. A wrench for engaging and turning a pipe nipple to facilitate its installation in or removal from a pipe, comprising in combination:

means for gripping the exposed end of the pipe nipple including a tubular barrel member adapted to be threaded to an open-ended nipple, and a bolt member threadedly connected to said barrel and axially movable therein for engaging the end of said nipple; and planetary gear drive means removably connected to said bolt including a drive shaft having a drive gear at one end with spaced apart gear teeth along its periphery, a rotatable disc fixed to an axially extending shaft, a plurality of pinion gears meshed with said drive gear and rotatably mounted on said central disc, clutch means attached to said axially extending shaft having radially extendable dog members for engaging the inner wall of the pipe threaded to said nipple to prevent rotation of said central disc, means for actuating said dog members of said clutch, an annular drive member having internal gear teeth in mesh with each of said pinion gears, said annular drive member having means for drivingly engaging said bolt, whereby when said clutch is actuated to rigidly connect said axially extending shaft, and said drive shaft is rotated in one direction, said central disc is prevented from rotating and said pinion gears operate to drive said annular drive member and said bolt.

3. In a torque multiplying wrench for engaging and turning a threaded fitting to facilitate its installation in or removal from a threaded opening and in combination with means for gripping the exposed end of the threaded fitting, said means for gripping the exposed end of the threaded fitting including a tubular barrel member and a bolt threadedly connected to said barrel member and axially movable therein for engaging the end of said threaded fitting, an epicyclic drive means removably connected to said bolt comprising:

a drive shaft having a drive gear at one end with spaced apart gear teeth along its periphery;

a central disc aligned with said drive shaft, an axially extending shaft fixed to said central disc;

a plurality of satellite gears meshed with said drive gear and rotatably mounted on said central disc;

means for temporarily connecting said axially extending shaft to the inner wall of the opening for said threaded fitting;

an annular drive member having internal gear teeth in mesh with each of said satellite gears;

means on said annular drive member for drivingly engaging said bolt.

4. A wrench for engaging and turning a pipe nipple to facilitate its installation in or removal from a pipe, comprising in combination:

means for gripping the exposed end of the pipe nipple including a tubular barrel member adapted to be threaded to an open-ended nipple, and a bolt member threadedly connected to said barrel and axially movable therein for engaging the end of said nipple; and planetary gear drive means removably connected to said bolt and comprising:

a drive shaft having a drive gear at one end with spaced apart gear teeth along its periphery;

a rotatable disc fixed to an axially extending shaft;

a plurality of pinion gears meshed with said drive gear and rotatably mounted on said central disc;

clutch means attached to said axially extending shaft for engaging the inner wall of the pipe threaded to said nipple to prevent rotation of said central disc;

an annular drive member having internal gear teeth in mesh with each of said pinion gears;

means on said annular drive member for drivingly engaging said bolt including radially outwardly extending spaced apart lug portions adapted to mesh with a castellated rim on said bolt of said gripping means.

5. A wrench for engaging and turning a pipe nipple to facilitate its installation in or removal from a pipe, comprising in combination:

means for gripping the exposed end of the pipe nipple including a tubular barrel member adapted to be threaded to an open-ended nipple, and a bolt member threadedly connected to said barrel and axially movable therein for engaging the end of said nipple; and torque booster means drivingly engageable with said bolt of said gripping means including a housing having a cylindrical cavity and an annular gear on its inner wall with radially inwardly extending gear teeth;

a drive shaft extending from said housing and having a drive gear at one end within said housing;

a central disc rotatably supported within said housing;

an axially extending shaft fixed to said central disc;

a plurality of satellite gears rotatably mounted in spaced apart relationship on said central disc, each being meshed with said drive gear and said annular gear;

clutch means attached to said axially extending shaft for preventing the rotation of said central disc, comprising:

a central body member;

a plurality of dog members pivotally mounted near the periphery of said body member and movable from a retracted position within the circumferential edge of said body member to an extended position wherein the ends of said dog members project substantially radially outwardly of said circumferential edge;

said dog members having a tapered end portion terminating at an edge;

a cam plate rotatable relative to said central body member and having spaced apart slot means for moving said dog members from the retracted to the extended positions when moved relative to said body member;

means on said torque booster for operating said rotary cam plate.

6. A torque multiplying wrench for engaging and turning a pipe nipple to facilitate its installation in or removal from a pipe, comprising in combination:

means for gripping the exposed end of the pipe nipple; and torque booster means removably engageable with said gripping means comprising:

a housing having a cylindrical cavity and an annular gear on its inner wall with radially inwardly extending gear teeth;

a drive shaft extending from said housing and having a drive gear at one end within said housing;

a central disc rotatably supported within said housing;

an axially extending shaft fixed to said central disc;

a plurality of satellite gears rotatably mounted in spaced apart relationship on said central disc, each being meshed with said drive gear and said annular gear;

clutch means attached to said axially extending shaft for preventing the rotation of said central disc when said drive shaft is rotated during the removal or installation of a nipple, said clutch comprising:

a central body member;

a plurality of dog members pivotally mounted near the periphery of said body member and movable from a retracted position completely within the circumferential edge of said body member to an extended position wherein the ends of said dog members project radially outwardly said circumferential edge;

said dog members having a tapered end portion terminating at an edge;

a rotary cam plate having spaced apart slot means for moving said dog members from the retracted to the extended positions when rotated relative to said body member;

a stud member fixed to said rotary cam plate and extending through a slot in said body member;
a control rod extending axially through said torque booster;
a radially extending actuating arm adjustably connected to the lower end of said control rod and engageable with said stud member for rotating said cam plate and moving said dog members.

7. A torque multiplying wrench for engaging and turning a pipe nipple to facilitate its installation in or removal from a pipe, comprising in combination:
means for gripping the exposed end of the pipe nipple;
and torque booster means drivingly connected with said gripping means comprising:
a housing having a cylindrical cavity and an annular gear on its inner wall with radially inwardly extending gear teeth;
a drive shaft extending from said housing and having a drive gear at one end with said housing;
a central disc rotatably supported within said housing;
an axially extending shaft fixed to said central disc;
a plurality of satellite gears rotatably mounted in spaced apart relationship on said central disc, each being meshed with said drive gear and said annular gear;
clutch means attached to said axially extending shaft for preventing the rotation of said central disc when said drive shaft is rotated during operation of the wrench, and comprising
a body member;
a plurality of dog members pivotally mounted near the periphery of said body member and movable from a retracted position completely within the circumferential edge of said body member to an extended position wherein the ends of said dog members project substantially radially outwardly said circumferential edge;
a rotary cam plate attached to one side of said body member and having cam slot means for moving said dog members from the retracted to the extended positions when rotated relative to said body member;
stud means fixed to said rotary cam means and extending axially through said rotary cam plate;
control means for engaging said stud means to engage and disengage said clutch; and
means for removably retaining said clutch means on said axially extending shaft whereby said clutch can be used in reversed positions when removing and when installing pipe nipples.

8. The device as described in claim 7 wherein said latter means comprises an adjustable collar above said clutch and an axially adjustable pin member connected to said actuating arm.

9. A torque multiplying wrench for engaging and turning a pipe nipple to facilitate its installation in or removal from a pipe, comprising in combination:
means for gripping the exposed end of the pipe nipple;
and torque booster means removably engageable with said gripping means comprising:
a housing having a cylindrical cavity and an annular gear on its inner wall with radially inwardly extending gear teeth;
a drive shaft extending from said housing and having a drive gear at one end within said housing;
a central disc rotatably supported within said housing;
an axially extending shaft fixed to said central disc;
a plurality of satellite gears rotatably mounted in spaced apart relationship on said central disc, each being meshed with said drive gear and said annular gear;
means attached to said axially extending shaft for preventing the rotation of said central disc when said drive shaft is rotated;
a circular member;
a plurality of pipe wall engaging members movably mounted on said circular member; and
means on said circular member for extending said wall engaging members thereby causing them to frictionally engage the walls of the pipe retaining the nipple to be removed,
said latter means including a control rod extending axially through said torque booster means;
whereby input torque applied to said drive shaft is transmitted to said annular drive member and thence to said gripping means and the pipe nipple.

References Cited by the Examiner
UNITED STATES PATENTS

| | | | |
|---|---|---|---|
| 992,887 | 5/11 | Voo | 81—57 |
| 1,123,409 | 1/15 | Sill | 81—57 |
| 1,150,178 | 8/15 | Diefendorf | 81—57 |
| 1,210,823 | 1/17 | Mahoney et al. | |
| 1,653,531 | 12/27 | Affleck et al. | |
| 1,762,515 | 6/30 | Hiersch | 81—57 |
| 2,468,867 | 5/49 | Collins | 81—72 |
| 2,522,038 | 9/50 | Houghton. | |
| 2,528,873 | 11/50 | Dorman | 81—72 X |
| 2,641,136 | 6/53 | Marsden et al. | 81—57 |
| 2,721,591 | 10/55 | Criswell | 81—57 X |
| 2,780,944 | 2/57 | Ondeck | 81—57 X |
| 2,906,152 | 9/59 | Brase. | |
| 3,041,902 | 7/62 | Wing | 81—56 |

WILLIAM FELDMAN, *Primary Examiner.*